May 10, 1955  H. F. BESELER  2,707,846
TREE SLING
Filed March 9, 1951
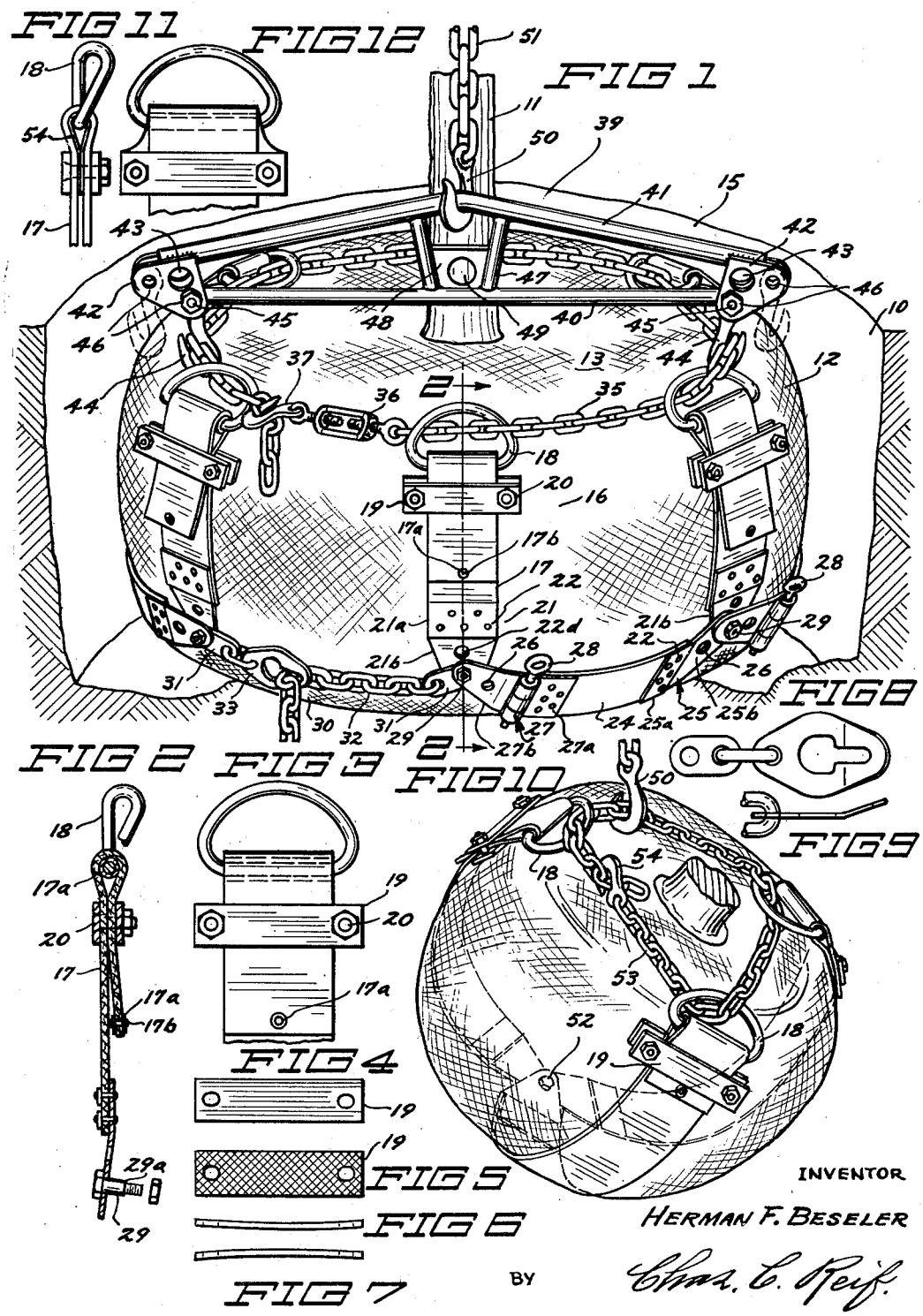
INVENTOR
HERMAN F. BESELER
BY Chas. E. Reif.
ATTORNEY

United States Patent Office 2,707,846
Patented May 10, 1955

2,707,846

TREE SLING

Herman F. Beseler, Minneapolis, Minn.

Application March 9, 1951, Serial No. 214,663

8 Claims. (Cl. 47—37)

This invention relates to a device for the handling of trees which are to be transplanted. A substantial business has been developed by nurserymen in the transplanting of trees. As a result a definite need has arisen for efficient equipment to aid in doing this work.

It is therefore an object of this invention to provide a device to be used for handling of trees to be transplanted.

It is another object of this invention to provide a device which can be disposed about a tree ball to lift the same out of the ground and transport it to a new location.

It is a still further object of this invention to provide a tree sling which can be disposed about a tree ball to hold the same whereby said sling and tree ball may be lifted by a winch or hoist and transported to a new location.

It is more specifically an object of this invention to provide a tree sling having in combination, a plurality of circumferentially spaced vertically extending members, means for connecting said members, and means for securing said last mentioned means about a tree ball whereby said sling and tree ball can be lifted.

It is a still more specific object of this invention to provide a tree sling having in combination, a plurality of circumferentially spaced vertical extending members, circumferentially extending members connecting the lower ends of said members and a flexible member extending through the upper ends of said vertically extending members whereby said last mentioned member may be engaged by a yoke which is attached to a lifting means whereby said tree sling can be readily lifted.

These and other objects and advantages of the invention will be fully set forth in the following description made in connection with the accompanying drawings in which like reference characters refer to similar parts throughout the several views and in which:

Fig. 1 is a view in perspective showing the tree sling in operative position;

Fig. 2 is a view in vertical section taken on line 2—2 of Fig. 1 in the direction indicated by the arrows;

Fig. 3 is a view in front elevation of the upper portion of a vertically extending strap with some parts shown in dotted line;

Fig. 4 is a plan view of a clamping plate;

Fig. 5 is a plan view of a modification of a clamping plate;

Fig. 6 is a view in end elevation of the clamping plate in Fig. 4;

Fig. 7 is a view in end elevation of the modified clamping plate shown in Fig. 5;

Fig. 8 is a plan view showing a plate with a key slot;

Fig. 9 is a view in side elevation of the plate shown in Fig. 8;

Fig. 10 is a view in perspective showing a modification of a tree sling;

Fig. 11 is a view in end elevation showing a modification of a vertically extending strap; and Fig. 12 is a view in front elevation of the strap shown in Fig. 11.

Referring to the drawings, a tree sling is shown comprising in combination, a plurality of circumferentially spaced vertically extending members 16. The number of said vertically extending members used will be determined by the size of the tree ball to be handled. Said vertically extending members comprise straps 17 which in the embodiment of the invention illustrated are shown as being made of a tough resilient sheet material such as strong fabric, belting or an equivalent, said straps thus being quite flexible. A semi-circular member or loop 18 is provided. The upper end of said strap 17 is extended through said loop and said overlapping end and the body of said strap are held together by a clamp 19. A sleeve or thimble 15 surrounds the straight side of said loop 18 and is engaged by strap 17. Said clamp comprises a pair of plates which can be made of metal or an equivalent substance and which are rectangular in horizontal and vertical section. Said plates are apertured adjacent their respective ends to receive headed and nutted bolts 20. Washers 17a are secured to the sides of the free end of each strap 17 by headed rivets 17b to prevent the free end of said strap from slipping through said clamp. A metal plate 21 is provided having an upper rectangular portion 21a secured to the lower end of said strap 17, as by spaced rivets 22, and having a lower tapered portion 21b with vertically spaced apertures 22d therethrough.

Disposed between adjacent portions 21b is a strap 24. Said strap is made of strong resilient sheet material such as belting. Secured to one end of strap 24 is a plate 25 having a rectangular end portion 25a and another tapered end portion 25b. Said rectangular portion is secured to one end of said strap as by spaced rivets 22, and the tapered end has a pair of longitudinally spaced apertures 26 therethrough. At the opposite end of said strap 24 is a member 27 having a rectangular portion 27a secured to said strap as by spaced rivets 22 and a tapered portion 27b having a pair of laterally spaced apertures therethrough. Said tapered portion is hinged to said rectangular portion and removably secured thereto by a removable pintle 28 shown as having an eyelet at one end. Said ends of strap member 24 are removably secured to the lower ends of vertically extending members 17 as by headed and nutted studs 29, said studs being provided with a reduced threaded portion forming a shoulder 29a to prevent clamping by said nuts and thus allow free swinging movement between the members thus secured.

Extending between the lower ends of one adjacent pair of vertically extending members is a flexible member 30. Said member 30 is shown as a chain having an apertured plate 31 secured at each end thereof adapted to be secured to said lower ends of portions 21b by headed and nutted studs 29. Secured to one plate 31 is a flexible member 32 which in the embodiment of the invention illustrated, is shown as a link chain. Secured to the other plate 31 is a member 33 having a key slot therein adapted to have said chain adjustably secured therein and thus provide substantial lateral adjustment of adjacent straps.

Extending through loops 18 is a flexible member 35 shown as a link chain. Secured to one end link of chain 35 is a turnbuckle 36 which is of a common variety and permits longitudinal adjustment. Secured to the outer end of said turnbuckle is a hook 37 adapted to engage the links of the opposite end of chain 35.

Adapted to engage member 35 for the purpose of lifting the same is a yoke 39. Said yoke is shown as a triangular shaped member comprising a horizontal bar 40 spaced above which is a bar 41 having slightly depending sides. Adjacent ends of said bars 40 and 41 are in vertical alignment and are respectively secured by triangular shaped plates 42 with each of said plates having an aperture 43 respectively therethrough. A pair of obliquely spaced apertures 46 are disposed through each of said plates to provide alternate means for receiving hooks 44 to be secured therein by headed and nutted bolts 45. Two laterally spaced vertical bars 47 connect members 40 and 41 adjacent their midpoint. Secured between the lower half of said bars 47 is a plate 48 with a centrally disposed aperture 49 therethrough.

A hook 50 is shown engaging said yoke at the center of bar 41. Said hook is secured to a chain 51, said chain being secured to any suitable lifting device, such as a winch on a truck, by which said sling may be raised.

In operation, when a tree is to be handled, a trench 10 is dug about a tree 11 and the trench should slightly undercut the tree forming a tree ball 12 about the roots of the tree. Tap roots may be cut away with a spade edge or a root pruner. Burlap 13 is then wrapped about the top and sides of said tree ball and suitably secured. The spaced vertically extending members are then placed about the tree ball with the circumferentially extending members 24 in position secured to the ends of said vertically extending members. Chain 30 will be in detached position from locking member 33. The chain member 35 will be in position extending through rings 18 with hook 37 in a disengaged position from the adjacent end of member 35. The sling is now in position about the tree ball ready to be secured thereabout. Chain 30 is drawn tightly through locking member 33 and is locked in the key slot 33. The lower ends of the vertically extending members may be positioned closer together by the use of the inner spaced apertures 26. The free end of the upper chain 35 is then drawn through the loops 18 until it is tight and hook 37 is then engaged in a link to hold the chain as taught as possible. Yoke 39 is then placed in position with hooks 44 respectively engaging member 35 at its opposite sides. Said hooks may be received in and secured to the inner and outer spaced apertures 46 depending on the size of the tree ball and the diameter of chain 35. A hook 50 is then engaged with the apex of said yoke or the aperture spaced directly below the apex. The tree ball is thus lifted with straight upward pull. Hook 50 may be engaged with either of the apertures 43 when a side pull or a side twisting jerk is required to break the roots loose from the earth. When the tree ball is lifted, there is generally some slack in the chain 35. This slack can be taken up by tightening the turnbuckle 36. The tree is then held in a lifted position or may be seated in a trailer until carried to the new location, where it can easily be lifted from the trailer and lowered to position. While being lowered in the new location, the tree can be easily rotated so that it can be placed in the most desirable position and then it is lowered into the prepared opening in the ground. The sling is easily removed. Member 30 may be disengaged from the key slot 33, or if more convenient, pintle 28 may be withdrawn from the hinged members 27a and 27b. Member 35 is disengaged from hook 37. The sling is then easily withdrawn from the tree ball and the tree is in proper position for completion of the transplanting operation.

Thus from the above description it will be seen that I have provided a very practical, efficient and easily operated sling for the lifting and moving of a tree ball for purpose of transplanting the same. This device is readily adjustable to accommodate any size of tree ball. It is easily placed in operating position and easily removed when the operation is completed. This permits the handling of a tree with ease and permits precise placement of the tree in the new location. This device is commercially made and has been used with great success. In Figs. 5, 6 and 7, the bars 19 are shown as having corrugated adjacent surfaces and said bars are bent into slightly curved form. The convex sides of said bars will be adjacent each other.

With reference to Figs. 11 and 12, a slight modification is shown in the method of looping a member 17 through a ring 18. Instead of having a ring provided with a sleeve or thimble, this modification shows the use of a liner 54 which is placed under the looped portion of member 17 and is gripped by the clamp 19. This liner in being thus gripped adds considerable strength to member 17.

Also with reference to Fig. 10, a modification of the device is shown with respect to lifting a small tree ball. Here the vertical members 17 have their lower ends joined by a common means 52, such as a nutted and headed bolt, as is illustrated. A flexible member 53, such as a chain, is extended through rings 18 and is provided with a hook 54 adapted to securely engage the free end of said flexible member. The lifting hook 50 depending from a lifting device engages the member 53 for lifting said sling and tree ball.

It will of course be understood that various changes may be made in the form, details, arrangement and proportions of the parts, without departing from the scope of applicant's invention, which generally stated, consists in a device capable of carrying out the combinations of parts disclosed and defined in the appended claims.

What is claimed is:

1. A sling adapted to hold a tree ball having in combination, a plurality of flexible vertically extending circumferentially spaced members, flexible means secured to and extending between the lower ends of said members, one of said means being extensible and contractible, said members having swingable loops secured to their upper ends, a flexible member extending through said loops, and a yoke engaging said last mentioned member for lifting said sling and said tree ball.

2. The structure set forth in claim 1, said last mentioned member comprising triangular portions at its ends each having a plurality of spaced apertures therein, hooks adapted to be pivotally secured in different ones of said apertures respectively, and a hook adapted to engage said last mentioned member for lifting said sling and tree ball.

3. A sling adapted to hold a tree ball having in combination, a plurality of flexible vertically extending circumferentially spaced straps, semi-circular rings, said straps having their upper ends looped through said rings and overlapping therebelow, adjustable clamps for securing said overlapping portions, said straps having vertically spaced apertures in their lower ends, members extending circumferentially between said lower ends and fastening means connecting said members to adjacent pairs of said ends and disposable in any one of said apertures respectively, a flexible member extending through said rings, said last mentioned member having means at one end for engaging said member at different points, and a member for engaging said last mentioned flexible member at opposite sides of said ball for lifting said ball.

4. The structure set forth in claim 3, said vertically extending straps each respectively having a plate with a tapered end portion secured to the lower end thereof, said tapered end portion having said vertically spaced apertures therein, and a member secured in the overlapping end of each of said straps to prevent said end from slipping through said clamp.

5. A sling adapted to hold a tree ball having in combination, a plurality of circumferentially spaced flexible vertically extending straps, means for varying the length of said straps, means connecting the upper ends of said straps, said means being movable relatively to said straps, and means connecting the lower ends of said straps, said last mentioned means including a plurality of flexible members respectively extending between said lower ends, pivots positively connecting the adjacent ends of said last mentioned members to the lower ends of said straps, said last mentioned members being swingable about said pivots.

6. A sling for embracing a tree ball having in combination a plurality of vertically extending flexible circumferentially spaced strap-like members, rigid loops movably connected to the upper ends of said members, a flexible member extending through said loops for drawing said strap-like members against said ball, flexible members engaging said ball and connecting the lower ends of said strap-like members and movable relatively thereto, and means for moving said last-mentioned members inwardly against said ball, said last mentioned members being pivotally connected to said strap-like members.

7. A sling for embracing a tree ball having in combination a plurality of vertically extending flexible circumferentially spaced strap-like members, rigid loops movably connected to the upper end portions of said members, a flexible member extending through said loops for drawing said strap-like members against said ball, flexible members engaging said ball and connecting the lower ends of said strap-like members and movable relatively thereto, and means for moving said last-mentioned members inwardly against said ball, said last-mentioned members comprising a plurality of sections swingingly connected for movement about axes extending transversely thereof.

8. A sling for supporting and carrying a tree ball having in combination, a plurality of flexible strap-like members spaced circumferentially about said ball and extending vertically, loops at the tops of said members, a flexible member extending through and movable relatively to said loops, means for connecting the lower ends of said members, said members having some swinging movement relatively to said last mentioned means, and means connected to said first mentioned member for lifting the same and drawing said strap-like members into clamping contact with said ball, said strap-like members conforming to the contour of said ball due to their flexibility and engaging said ball throughout most of their lengths.

References Cited in the file of this patent

UNITED STATES PATENTS

| | | |
|---|---|---|
| 621,405 | Garrett | Mar. 21, 1899 |
| 835,585 | Uffmann | Nov. 13, 1906 |
| 873,044 | Hanson | Dec. 10, 1907 |
| 1,139,735 | Spuhr | May 18, 1915 |
| 2,122,663 | Simeone | July 5, 1938 |
| 2,219,690 | Leydecker | Oct. 29, 1940 |